United States Patent [19]
You et al.

[11] Patent Number: 6,031,945
[45] Date of Patent: Feb. 29, 2000

[54] LOW-LOSS OPTICALLY ACTIVE DEVICE AND MANUFACTURING METHOD THEREFOR

[75] Inventors: Byong-gwon You, Daejeon; Hyung-jae Lee, Seoul; Tae-hyung Rhee, Sungnam; Yong-woo Lee, Yongin, all of Rep. of Korea

[73] Assignee: SamSung Electronics Co., Ltd., Kyungki-do, Rep. of Korea

[21] Appl. No.: 09/031,060

[22] Filed: Feb. 26, 1998

[30] Foreign Application Priority Data

Feb. 26, 1997 [KR] Rep. of Korea .......................... 97/6016

[51] Int. Cl.⁷ .................................................... G02B 6/121
[52] U.S. Cl. ................................ 385/14; 385/8; 385/130; 385/131; 385/42
[58] Field of Search ..................................... 385/14, 2, 15, 385/8, 16, 42, 43, 44, 45, 122–128

[56] References Cited

U.S. PATENT DOCUMENTS

| | | |
|---|---|---|
| 3,920,314 | 11/1975 | Yajima . |
| 4,887,884 | 12/1989 | Hayden . |
| 5,006,285 | 4/1991 | Thancara et al. . |
| 5,007,696 | 4/1991 | Thancara et al. . |
| 5,103,492 | 4/1992 | Ticknor ........................................ 385/9 |
| 5,181,262 | 1/1993 | Gerardus et al. . |
| 5,191,630 | 3/1993 | Tajima ..................................... 385/122 |
| 5,202,786 | 4/1993 | Boyle et al. . |
| 5,255,334 | 10/1993 | Mak et al. ................................. 385/41 |
| 5,315,422 | 5/1994 | Utaka et al. .............................. 385/3 X |
| 5,359,679 | 10/1994 | Tanaka et al. ............................... 385/8 |
| 5,376,506 | 12/1994 | Ehrfeld et al. ....................... 385/122 X |
| 5,546,480 | 8/1996 | Leonard ....................................... 385/3 |
| 5,555,326 | 9/1996 | Hwang et al. ............................... 385/2 |
| 5,617,499 | 4/1997 | Brueck et al. .......................... 385/122 |
| 5,692,075 | 11/1997 | Hwang et al. ............................... 385/3 |
| 5,703,975 | 12/1997 | Miller et al. .............................. 385/16 |
| 5,712,935 | 1/1998 | Miyakawa ................................. 385/22 |

FOREIGN PATENT DOCUMENTS

| | | |
|---|---|---|
| 0 477 898 A2 | 9/1991 | European Pat. Off. . |
| 6-214274 | 8/1994 | Japan . |
| 8-146475 | 7/1996 | Japan . |
| 96-324914 | of 0000 | WIPO . |
| WO 96/42027 | 12/1996 | WIPO . |

*Primary Examiner*—Phan T. H. Palmer
*Attorney, Agent, or Firm*—Robert E. Bushnell, Esq.

[57] ABSTRACT

A low-loss optically active device is provided by forming a lower clad layer using linear polymer on a substrate capable of transmitting ultraviolet (UV) light, forming a non-linear polymer core region of a waveguide region; forming a linear polymer core region on opposite sides of the non-linear core region, and forming an upper clad layer on the lower clad layer and linear and non-linear core regions of the waveguide region. The waveguide is formed using non-linear polymer only at the region where the non-linear effect such as optical modulation or optical switching occurs, and is formed using linear polymer at the remaining regions, thereby minimizing the overall waveguiding loss of the device.

12 Claims, 7 Drawing Sheets

LOW-LOSS OPTICALLY ACTIVE DEVICE AND MANUFACTURING METHOD THEREFOR

CLAIM FOR PRIORITY

This application makes reference to, incorporates the same herein, and claims all benefits accruing under 35 U.S.C. § 119 from applications for *LOW-LOSS OPTICALLY ACTIVE DEVICE AND MANUFACTURING METHOD THEREFOR* earlier filed in the Korean Industrial Property Office on Feb. 26, 1997, and there duly assigned Ser. No. 1997/6016.

BACKGROUND OF THE INVENTION

1. Field of the Invention

The present invention relates to optical devices and to processes for fabricating optical devices generally, and, more particularly, to low-loss optically active devices exhibiting reduced losses and to processes of fabricating optically active optical devices.

2. Description of the Related Art

In forming optically active devices such as an optical modulator or an optical switch using optical polymer, an optical waveguide formed in the device is typically constructed with a clad region and a core region. An exemplary structure may be found, for example, in the *Electro-optic Channel Waveguide* of J. I. Thackara, et alii, U.S. Pat. Nos. 5,006,285 and 5,007,696. If, as indicated for example, by the *Nonlinear Optical Device For Controlling A Signal Light By A Control Light* of K. Tajima, U.S. Pat. No. 5,191,630, all of the core regions of the waveguide forming an active device are made of non-linear optical material such as a non-linear optical polymer, we have noticed that the overall device loss characteristics are degraded. The waveguiding loss of a waveguide made of non-linear optical polymer exhibits a characteristic of 0.5–1.0 dB/cm, and the waveguiding loss of the waveguide made of linear optical polymer exhibits a characteristic of about 0.1–0.2 dB/cm. Therefore, in the case of forming a waveguide having the same length and configuration with each other, a waveguide made entirely of only the non-linear optical polymer have disadvantages due to the substantial, and in our opinion unnecessary injection losses of the device, compared to the case of forming a waveguide made of the linear optical polymer. Directional coupler type optical switches and conventional Mach-Zehnder type optical modulators (e.g., the *Hybrid All Optical Silica Waveguide Modulator Using Non-linear Electro-optic Components* of J. Leonard, U.S. Pat. No. 5,546,480; the *Mach-Zehnder Type Electro-optic Polymer Modulator In Which An Initial Output State can Be Controller By Post-photobleaching*, of W. Y. Hwang, et alii, U.S. Pat. No. 5,692,075), as well as such devices as the *Capillary Nonlinear Optical Waveguide Device* of L. M. Hayden, U.S. Pat. No. 4,887,884, conventionally have all regions in the waveguide including the electrode regions, formed of non-linear optical polymer that exhibits a comparatively higher optical loss than does linear optical polymer; consequently, the overall injection loss of the device is substantially increased.

SUMMARY OF THE INVENTION

It is therefore, one object of the present invention to provide low-loss optically active devices exhibiting reduced losses and processes for fabricating optically active optical.

It is another object to provide optically active devices that exhibit reduced waveguiding losses.

It is still another object to provide processes for forming waveguide cores by injecting non-linear optical polymer into only a waveguide region where a non-linear effect occurs.

It is yet another object to provide a process for fabricating low-loss optically active devices using optical polymer for reducing the waveguiding losses of waveguides in comparison devices formed with all core regions of the waveguide made of non-linear optical polymer.

It is still yet another object to provide low-loss optically active devices and processes for fabricating low-loss optically active devices constructed with only the core regions of the waveguide where optical modulation effects occur being formed of non-linear optical polymer.

It is also an object to provide low-loss optically active devices and processes for fabricating low-loss optically active devices constructed with only the core regions of the waveguide where optical modulation effects occur being formed of non-linear optical polymer, and with the waveguide of the remaining core regions being formed of linear optical polymer.

It is a further object to provide active optical devices and processes for fabricating active optical devices with opposite waveguide regions made of cores of linear optical polymer, feeding an intervening active or modulating region made of a non-linear polymer.

It is also an object to provide a low-loss optically active device using optical polymer for reducing the waveguiding loss of waveguide, compared to the case of forming all core regions of the waveguide with non-linear optical polymer, wherein only the core regions of the waveguide where optical modulation effects occur are formed of non-linear optical polymer, and the remaining core regions are formed of linear optical polymer.

It is a further object to provide a process for fabricating a low-loss optically active device.

These and other objects may be achieved according to the principles of the present invention with an optically active device for transmitting at least one input light beam received at an input port and at least one output light beam conducted to an output port, a substrate, and a lower clad layer disposed on a substrate. An optical waveguide disposed on the lower clad layer, is constructed of a non-linear core region necessitating the non-linear effect, and a linear core region not necessitating the non-linear effect, for waveguiding an optical signal. An upper clad layer is disposed on the optical waveguide and lower clad layer. The non-linear core region of the optical waveguide is disposed between the linear core regions and is made of non-linear polymer. The linear core regions of the optical waveguide have one end connected to the non-linear core region and the other end connected to the input or output port of the optical signal and are made of linear polymer having an optical waveguiding loss lower than the non-linear polymer. The lower and upper clad layers have refractive indices that arc lower than the indices of the linear polymer and non-linear polymer forming the waveguide cores.

These and other objects may also be attained with a process for fabricating an optically active device having the optical waveguide constructed with an optical waveguide core region (i.e. the non-linear core, or active, region) necessitating the non-linear effect when waveguiding an optical signal, and an optical waveguide core region (i.e., the linear core, or waveguide, region) that does not require any non-linear effect. A lower clad layer of linear polymer is formed on a substrate capable of transmitting ultraviolet light, and a first metal layer opaque to ultraviolet light is formed at a region on the lower clad layer, other than in one of those regions where the optical waveguide is to be disposed. A second metal layer made of a material different from that of the first metal layer and incapable of transmitting ultraviolet light is formed on the first metal layer disposed on and adjacent to both ends of the linear core region. A non-linear polymer layer is formed on the waveguide region, first metal layer and second metal layer. The non-linear polymer is cured at only the non-linear core region by exposure to ultraviolet light passing, for example, through the substrate from its bottom side and the uncured non-linear polymer formed on the first and second metal layers is removed. A third metal layer is formed on the non-linear polymer disposed on the non-linear core region, and the second metal layer is removed. Linear polymer is coated on the first metal layer and optical waveguide, and the linear polymer is formed at only the linear core region by exposure to ultraviolet light passing through the substrate from its bottom side. The first metal layer disposed on the lower clad layer and the third metal layer, is removed, and an upper clad layer is formed on the lower clad layer and waveguide core region.

The third metal layer may be formed by coating photoresist on the substrate having the cured non-linear polymer made in the step of forming the non-linear polymer; patterning the photoresist by irradiating the bottom side of the substrate with ultraviolet light so that the photoresist disposed on the cured non-linear polymer is removed; depositing the third metal layer on the patterned substrate by vacuum deposition; and lifting off the photoresist disposed on the substrate.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENT

Figure 1A:
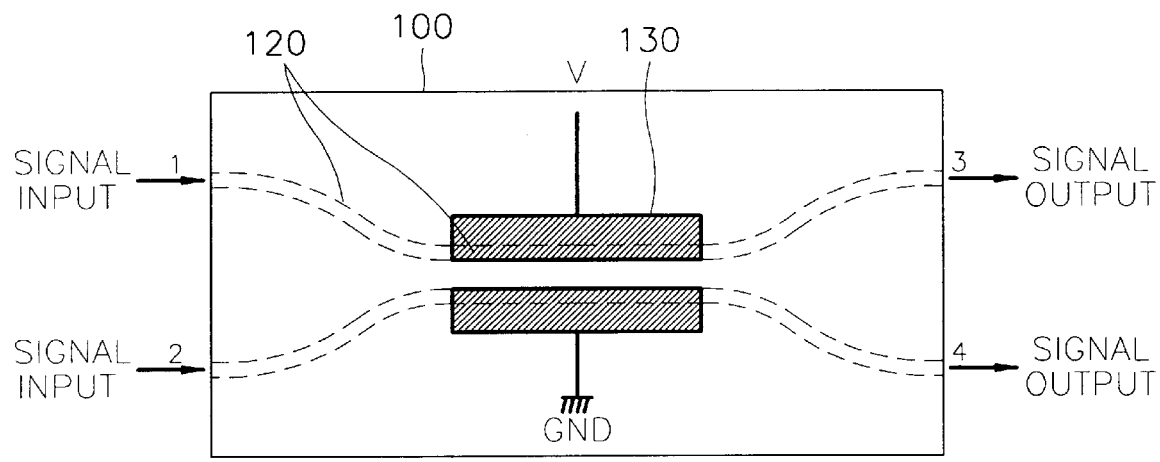
FIG. 1A shows a conventional directional coupler type optical switch in which all cores of a waveguide constituting the device are formed of non-linear polymer.
Figure 1B:
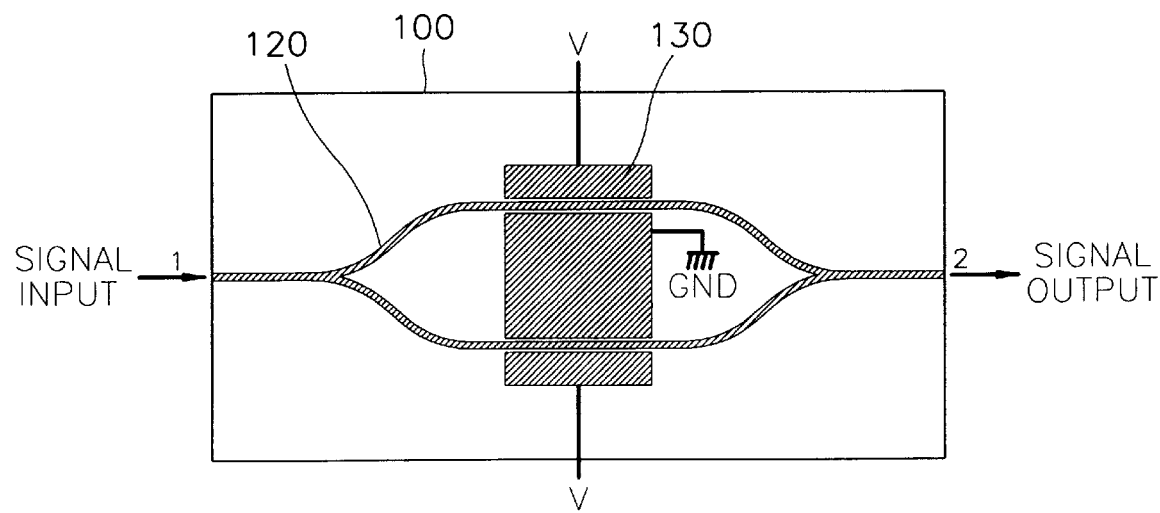
FIG. 1B shows a conventional Mach-Zehnder type optical modulator.

Turning now to the drawings, FIGS. 1A and 1B respectively show a conventionally constructed directional coupler type optical switch 20 and a conventionally constructed Mach-Zehnder type optical modulator 30. As shown, since all regions in the waveguide that include an electrode 130 are formed of non-linear optical polymer exhibiting a comparatively higher optical loss than a linear optical polymer, the overall injection loss experienced by these devices is increased considerably.

Figure 2:
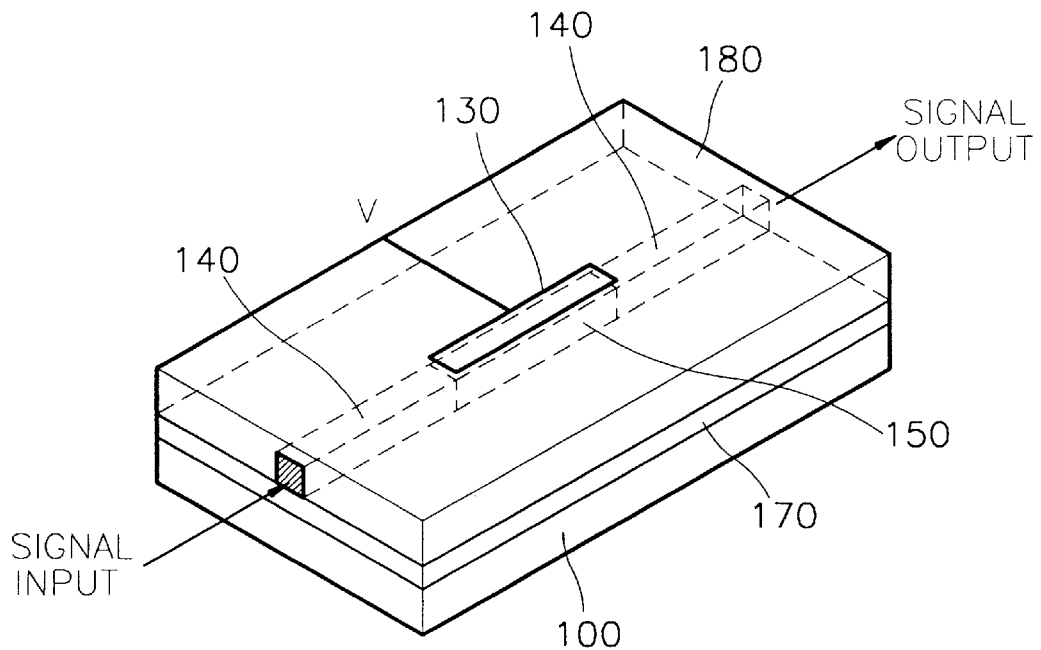
FIG. 2 is a schematic view illustrating a low-loss optically active device as an embodiment of the present invention.

Referring now to FIG. 2, a low-loss optically active device fabricated according to the principles of the present invention may be constructed with waveguide cores being made both of linear optical polymer and non-linear optical polymer. An electrode and the waveguide core made of the non-linear optical polymer are formed in the region where a non-linear effect occurs in the optically active device (i.e., within the active region). The optically active device includes a substrate 100, a lower clad layer 170 disposed on the substrate 100, an optical waveguide (140 and 150) disposed on the lower clad layer 170, and which are a linear core region 140 not necessitating the non-linear effect and a non-linear core region 150 necessitating the non-linear effect, respectively, for waveguiding optical signals, an upper clad layer 180 disposed on the optical waveguide (140 and 150) and the lower clad layer 170, and an electrode 130 disposed on the non-linear core region 150. The non-linear core region 150 of the waveguide is positioned between the linear core regions of the waveguide 140 and is made of non-linear optical polymer. One end of the linear core region of the waveguide 140 is connected to the non-linear core region 150 of the waveguide, and the other end thereof is connected to the input or output port of the optical signals. The linear core region 140 is made of linear optical polymer having a lower optical waveguiding loss than non-linear optical polymer. Also, the lower clad layer 170 and the upper clad layer 180 are formed of materials having lower refractive indices than those of the linear optical polymer and the non-linear optical polymer.

In fabricating an low-loss optically active device such as an optical switch or an optical modulator using non-linear optical polymer, according to the present invention, a polymer material having a curable functional group for the ultraviolet light and non-linear optic chromophores such as epoxy, acrylate or silicon-containing functionalities, is used.

Figure 3:
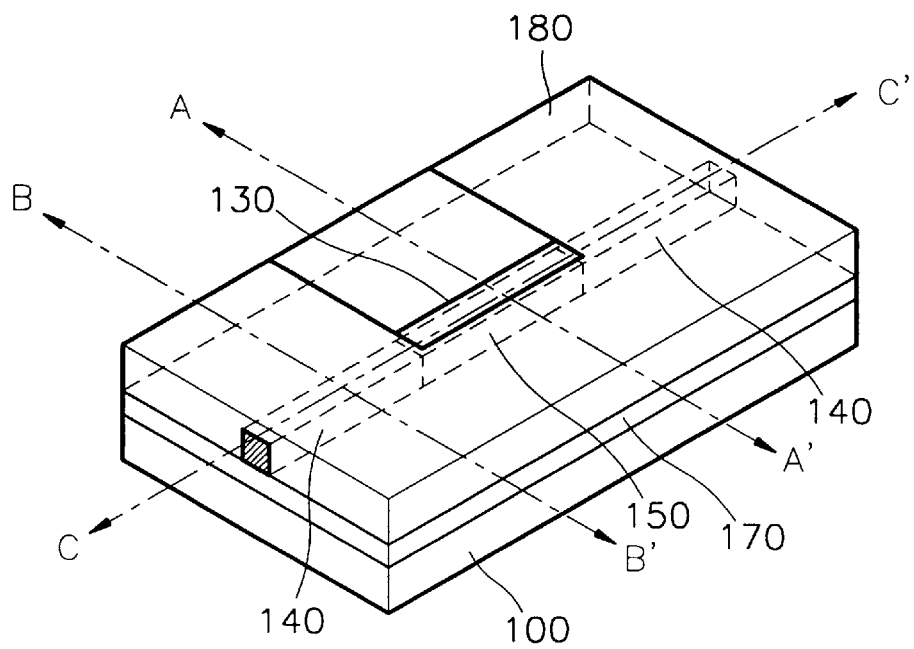
FIG. 3 is a view illustrating the definition of cross-section lines A—A', B—B' and C—C' in the overall arrangement of the present invention, for the sake of explanation.

The method for fabricating a low-loss optically active device according to the present invention by injecting the non-linear optical polymer into only the region where the non-linear effect occurs, will now be described by reference to FIG. 3 through 8F. FIG. 3 provides a view illustrating the definition of cross-section lines A—A', B—B' and C—C' of the overall arrangement of the present invention, for the sake of explanation of the present invention.

Figure 4:
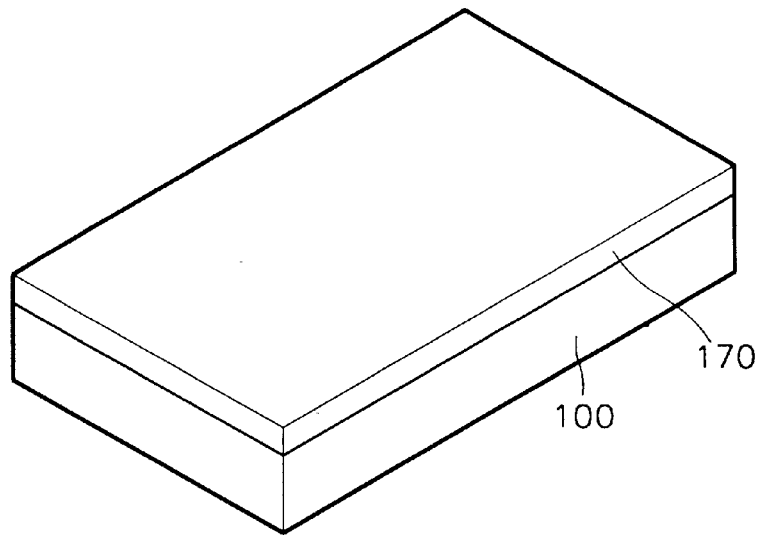
FIG. 4 shows that a lower clad layer that is coated on a substrate according to the principles of the present invention.

FIG. 4 shows that a lower clad layer is coated on a substrate according to the principles of the present invention. First, as a substrate, a transparent substrate 100 is provided. However, the substrate 100 is not specifically restricted, but any substrate through which ultraviolet light may be transmitted, can be used. For example, a slide glass may be used. Next, a lower clad layer 170 is formed of linear polymer on the surface of the substrate 100 using a spin-coating method. The film material of the lower clad layer 170 made of spin-coated linear polymer can be improved by being exposed to the ultraviolet light, curing and baking the same.

Figure 5:
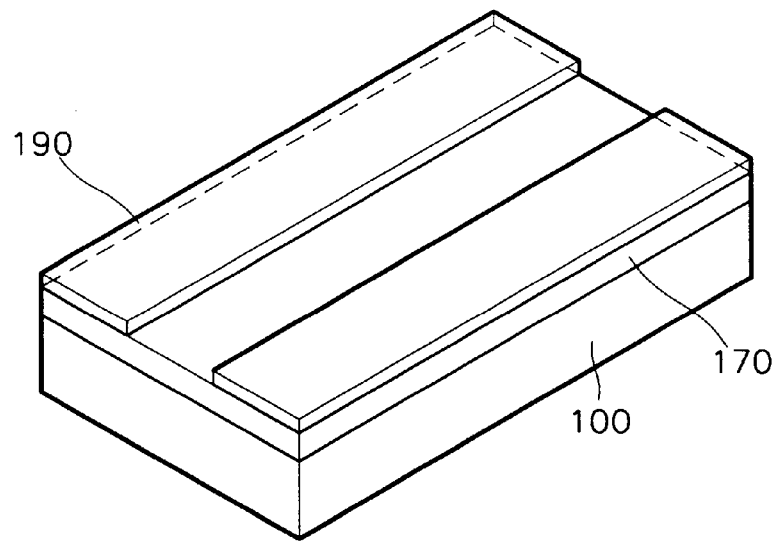
FIG. 5 shows that a first metal layer that is formed on the lower clad layer formed on the substrate according to the principles of the present invention.

FIG. 5 shows that a first metal layer 190 is formed on the lower clad layer 170 formed on the substrate 100 according to the present invention. To form the first metal layer 190, photoresist (PR) is coated on the lower clad layer 170 by a spin-coating method. Then, photomasks having a predetermined pattern are aligned on the substrate 100 and the ultraviolet light is selectively irradiated onto the photoresist. Thereafter, the photoresist PR is dipped into a developer liquid for development, and then baked, thereby forming a photoresist pattern. The first metal layer 190 is deposited on the lower clad layer 170 on which the photoresist pattern is formed by a vacuum deposition method such as sputtering, electron beam or thermal evaporation. After deposition, the photoresist PR is lifted off, thereby completing the first metal layer 190.

Figure 6:
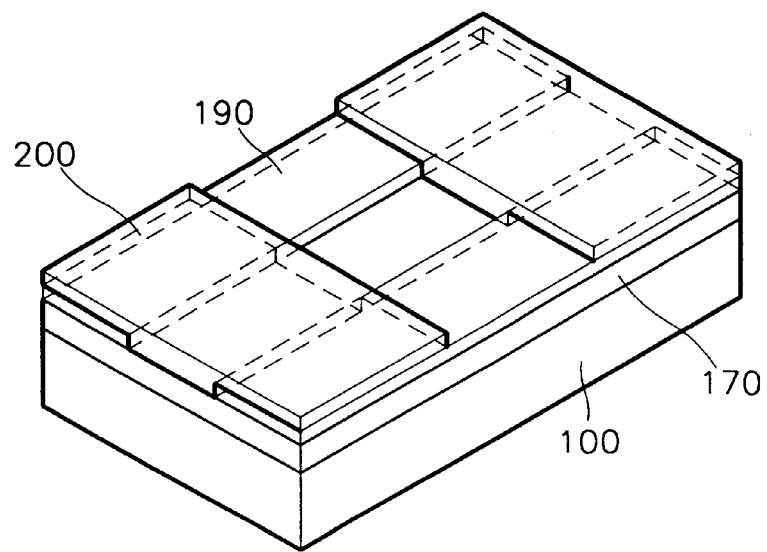
FIG. 6 shows that a second metal layer that is formed on the first metal layer according to the principles of the present invention.

FIG. 6 shows that a second metal layer 200 is formed on the first metal layer 190 according to the present invention. The second metal layer 200 is formed in the same manner as the first metal layer 190. In other words, the photoresist PR is coated on the substrate 100 where the lower clad layer 170 and the first metal layer 190 are formed, and the photomasks are aligned on the substrate 100 and the ultraviolet light is irradiated thereonto, thereby forming a photoresist pattern for the second metal layer 200. Thereafter, a metal is deposited on the resultant structure having the photoresist pattern by a vacuum deposition method, and the photoresist PR is lifted off, thereby completing the second metal layer 200. The first and second metal layers 190 and 200 must be formed of different materials from each other. Particularly, when etching the second metal layer 200 using an etchant, the first metal layer 190 must not be affected by the etchant. The first and second metal layers 190 and 200 serve as masks for the ultraviolet light in forming waveguide cores made of non-linear polymer and linear polymer.

FIGS. 7A through 7E are flow diagrams, taken along the lines A—A' and C—C' shown in FIG. 4, illustrating the waveguide core 150 made of non-linear organic polymer are selectively formed at the region where the non-linear effect occurs, according to a preferred embodiment of the present invention.

First, to form the waveguide core 150 made of non-linear polymer in the region where the non-linear effect occurs in the device, non-linear organic polymer curable by the ultraviolet light is spin-coated to form a non-linear polymer layer 160 on the substrate 100.

Figure 7A:
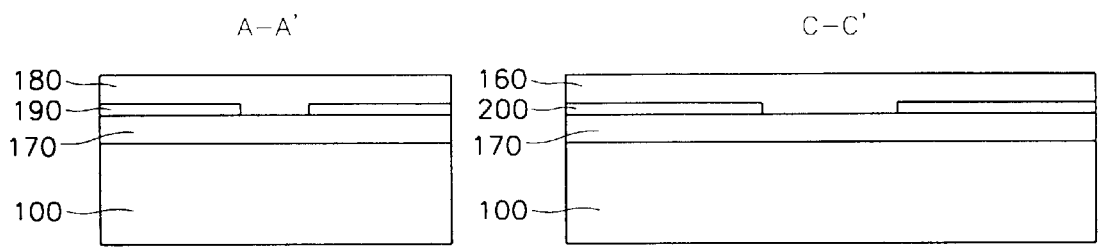
FIGS. 7A through 7E are flow diagrams, taken along sectional lines A—A' and C—C' shown in FIG. 4, illustrating that the cores in the waveguide made of non-linear organic polymer are selectively formed at the region where the non-linear effect occurs, in one preferred embodiment of the present invention.
Figure 7B:
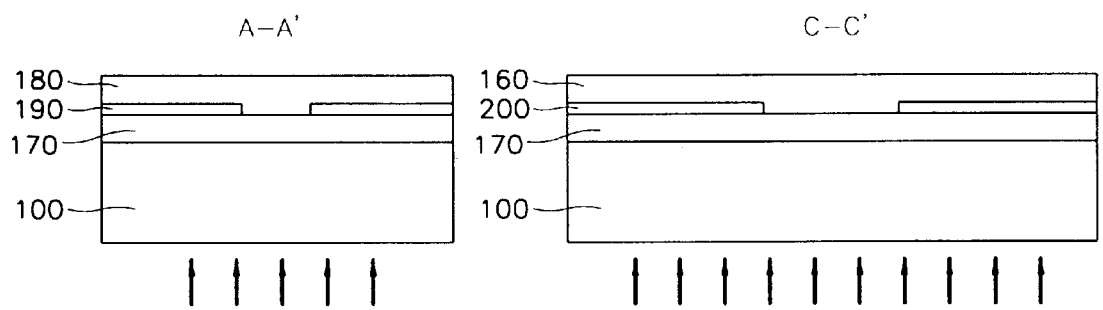
Figure 7C:
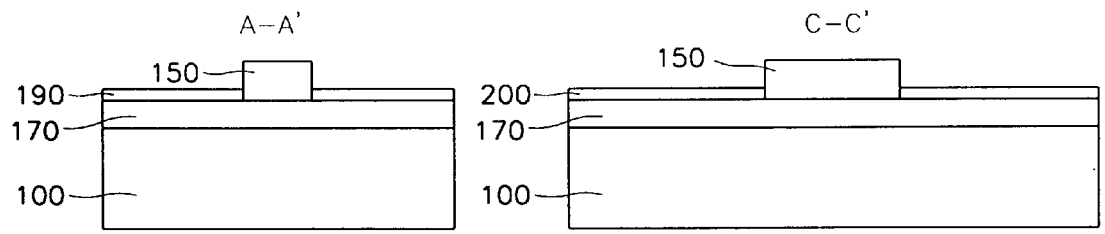

FIG. 7A shows that the non-linear polymer layer 160 is formed by a spin-coating method, according to the present invention. Then, as shown in FIG. 7B, the ultraviolet light is exposed to the substrate 100 from its bottom side. The first and second metal layer 190 and 200 serve as masks against the ultraviolet light so that only the non-linear polymer in the non-metal layer portion is selectively cured. The thus-selectively-cured portion becomes the waveguide core 150 made of non-linear polymer. These steps are illustrated in FIGS. 7B and 7C.

Figure 7D:
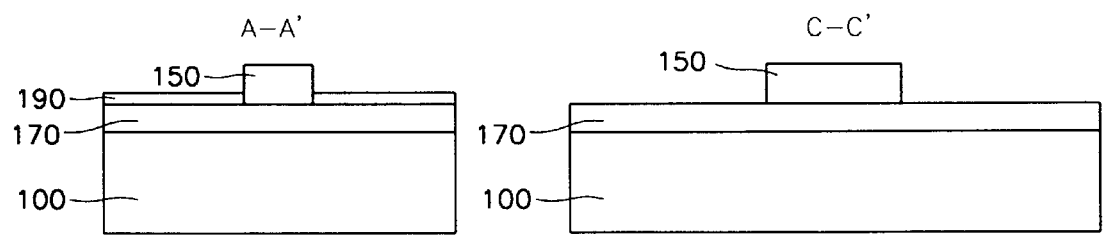
Figure 7E:
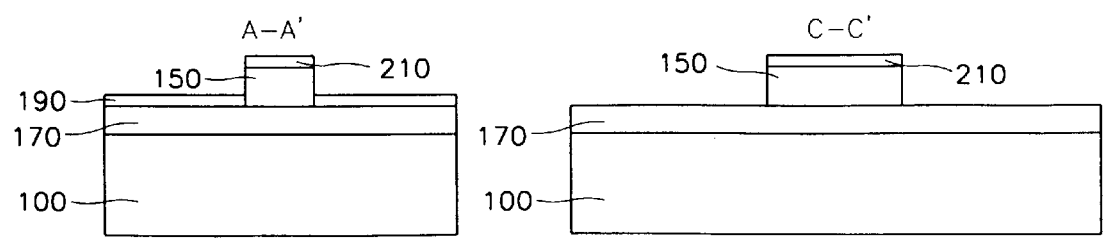

FIGS. 7D through 7E show that a third metal layer 210 is formed. In detail, first, photoresist PR is coated on the substrate 100 where the waveguide core 150 is formed by a spin-coating method. Likewise, the ultraviolet light is irradiated to the substrate 100 from its bottom side without a separate mask alignment operation. The photoresist portion exposed to the ultraviolet light is removed during development and the other portions remain. After performing photoresist patterning in such a manner, the third metal layer 210 is deposited by vacuum deposition. After depositing the third metal layer 210, the photoresist PR is lifted off, thereby forming the third metal layer 210 only on the region of the waveguide core 150 made of non-linear polymer, as shown in FIG. 7E. The second metal layer 200 is later etched using an etchant.

Figure 8A:
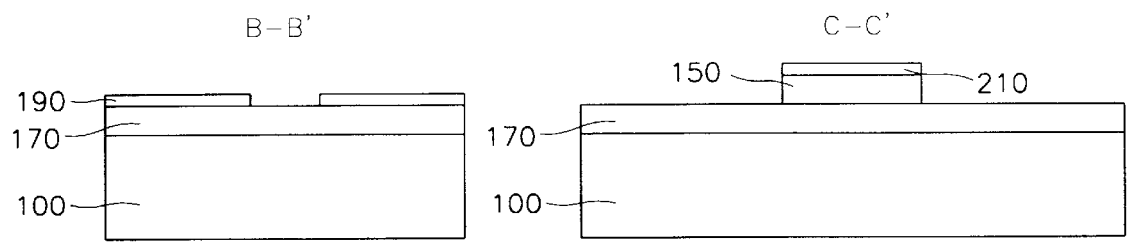
FIGS. 8A through 8F are flow diagrams, taken along sectional lines B—B' and C—C' shown in FIG. 4, illustrating that the cores in the waveguide made of linear polymer are selectively formed at the region where the non-linear effect does not occur, in a preferred embodiment of the present invention.
Figure 8B:
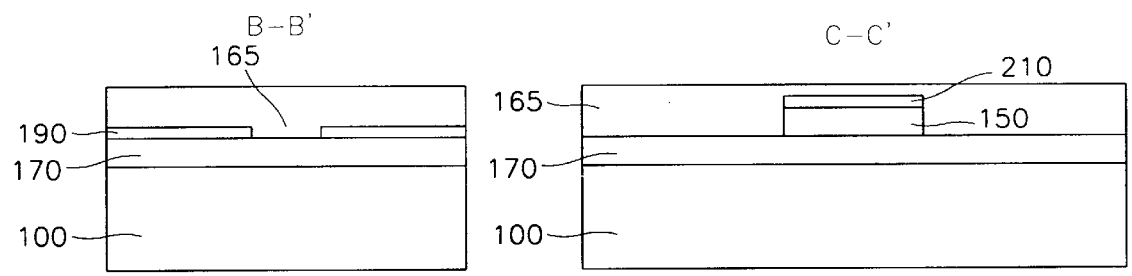
Figure 8C:
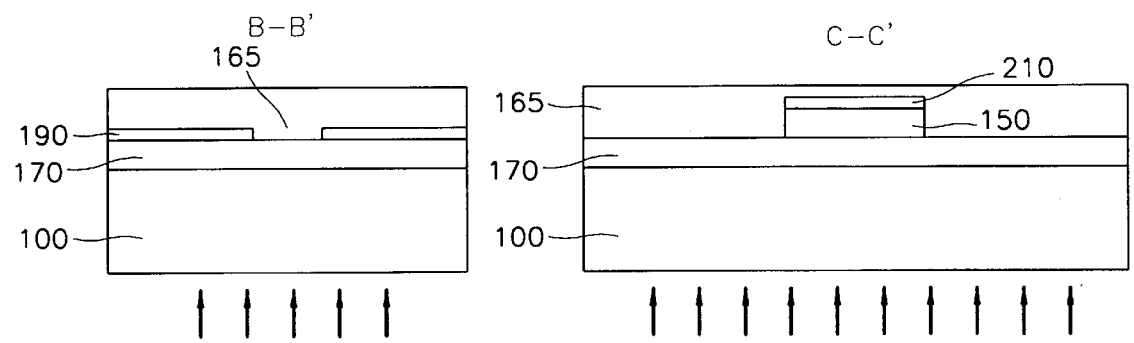
Figure 8D:
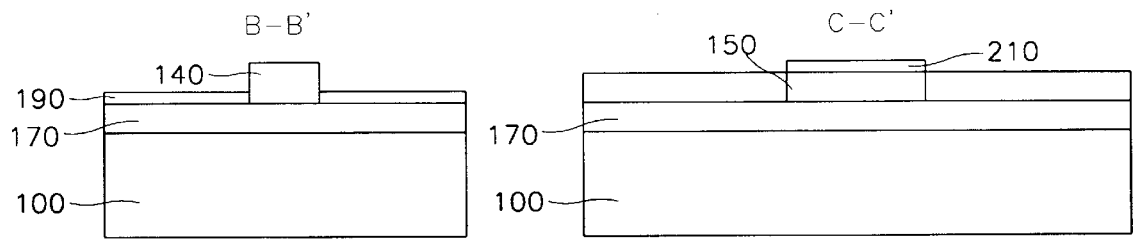
Figure 8E:
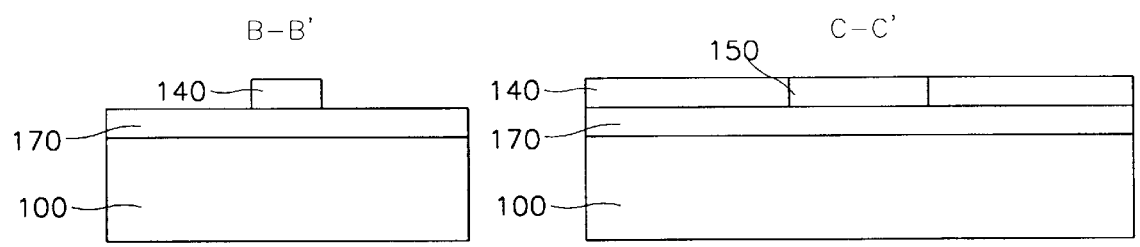
Figure 8F:
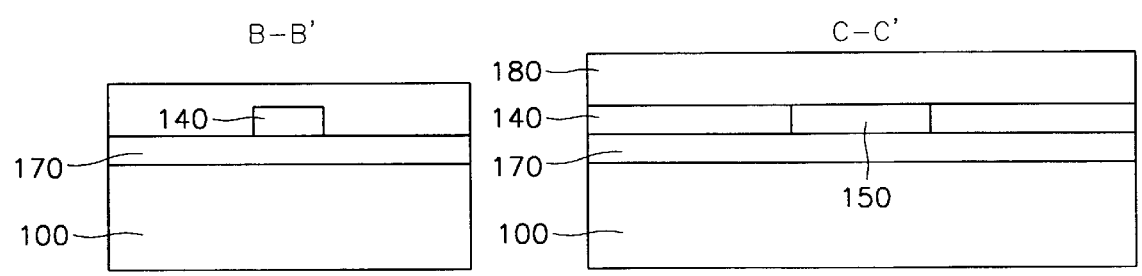

In a subsequent process, a waveguide core 140 made of linear polymer is connected to the waveguide core 150 made of non-linear polymer. FIGS. 8A through 8F are flow diagrams, taken along the lines B—B' and C—C' shown in FIG. 4, illustrating the waveguide core 140 made of linear organic polymer are selectively formed at the region where the non-linear effect does not occur, according to a preferred embodiment of the present invention. As shown in FIG. 8A, the lower clad layer 170 and the first metal layer 190 are formed on the substrate 100, based on the line B—B'. As is shown in FIG. 8B, based on the line C—C', the linear polymer is spin-coated on the substrate 100 on which the waveguide core 150 made of non-linear polymer and the third metal layer 210 are sequentially deposited. Then, as shown in FIG. 8C, the ultraviolet light is irradiated onto the substrate 100 from its bottom side so that the ultraviolet light is masked by the first metal layer 190. Thus, only the region for the linear waveguide core is cured by the ultraviolet light, thereby forming the waveguide core 140 made of linear polymer. Here, the curable thickness is adjusted by the amount of the irradiated ultraviolet light. The remaining linear polymer portion which is not cured by the ultraviolet light is removed using an appropriate solvent. FIG. 8D shows that a linear polymer waveguide core 140 is formed by curing the linear polymer. Also, as shown in FIG. 8D, the third metal layer 210 on the waveguide core 150 made of non-linear polymer and the first metal layer 190 disposed on the lower clad layer 170 are etched using an etchant. Then, the polymer serving as an upper clad is spin-coated on the substrate 100 and the resultant structure is entirely Ultraviolet-cured, thereby completing the upper clad layer 180. FIG. 8E shows the waveguide comprised of the non-linear polymer waveguide core 150 and the linear polymer waveguide core 140 connected with each other.

Next, the operation of the present invention will be described. FIG. 2 shows a low-loss optically active device according to the present invention constructed such that waveguide cores 140 and 150 are made of both linear polymer and non-linear polymer and an electrode 130 and the waveguide core 150 made of the non-linear polymer are formed in a region where a non-linear effect occurs in the optically active device. The optical signal input from one end passes through the waveguide core 140 made of the linear polymer having a low loss in optical traveling in the region not necessitating the non-linear effect, by a voltage directly applied to the electrode 130 or an electric field, within the optically active device. Then, the optical signal is changed in its optical characteristics by the voltage directly applied to the electrode 130 or electric field while passing through the waveguide core 150 made of the non-linear polymer of the electrode portion. The changed optical signal passes through again the waveguide core 140 made of the linear polymer and is output to the output port.

According to the conventional method, the waveguide core 150 is formed of the non-linear polymer having a higher waveguiding loss than the linear polymer, even in the waveguide region in which it is necessary for the optical signal to just travel. Thus, the overall waveguiding loss of the device is increased, which increases the injecting loss of the device.

In contrast with the conventional method, according to the present invention, the waveguide core 150 made of non-linear polymer is formed only at the region where the non-linear effect occurs, and the waveguide core 140 made of linear polymer is formed at the remaining regions, thereby lowering the overall waveguiding loss and injecting loss of the device.

Figure 9A:
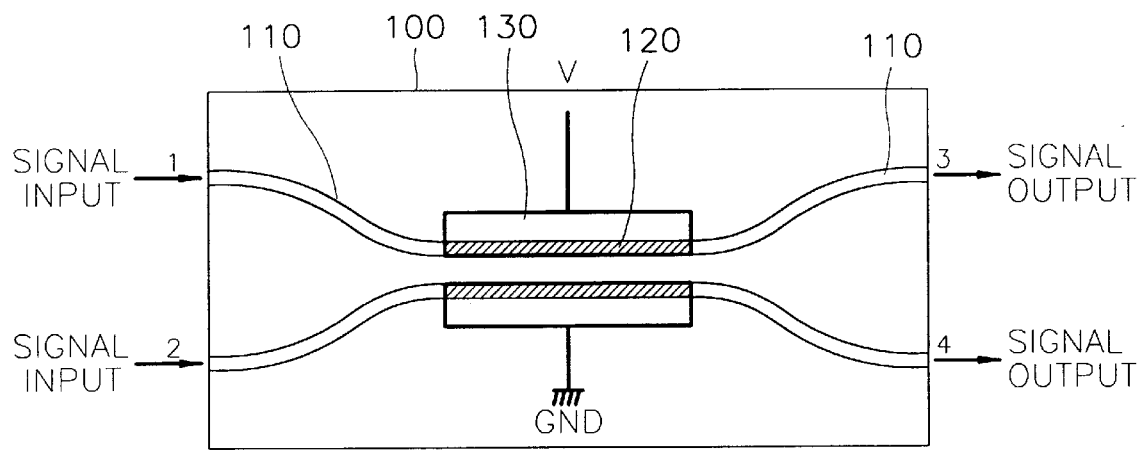
FIGS. 9A and 9B respectively show a directional coupler type optical switch and a Mach-Zehnder type optical modulator according to a preferred embodiment of the present invention.
Figure 9B:
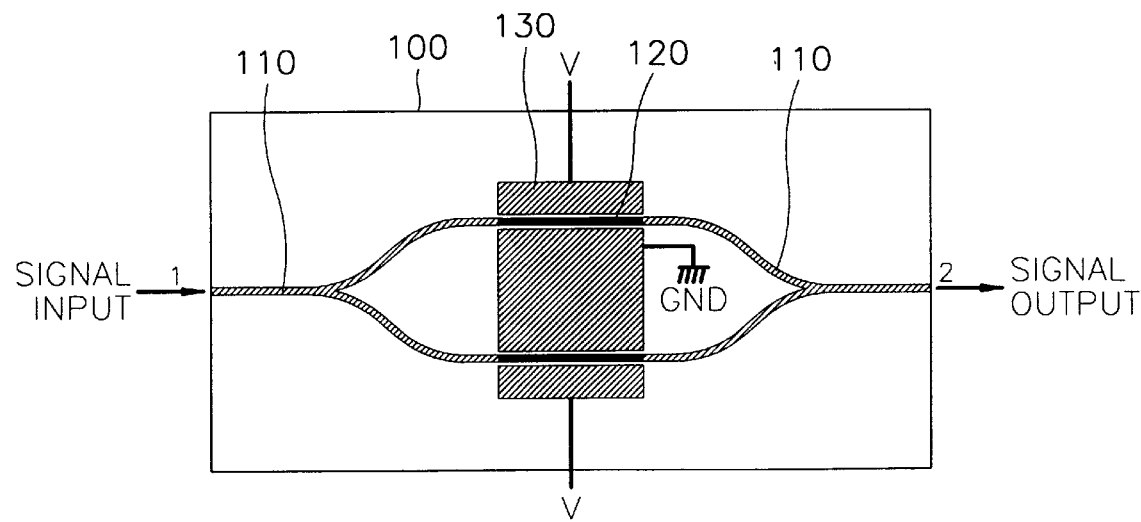

FIGS. 9A and 9B show a directional coupler type optical switch and a Mach-Zehnder type optical modulator according to a preferred embodiment of the present invention, respectively. FIG. 9A shows a directional coupler type optical switch which is one of an optically active device. An optical signal input from an input port 1 passes through a waveguide 110 made of linear polymer having a low light traveling loss within the optically active device. The optical signal is changed in its optical characteristics by the voltage directly applied to the electrode 130 or electric field while passing through the waveguide 120 made of the non-linear polymer of the electrode portion. The changed optical signal passes through again the waveguide 110 made of the linear polymer and is output to an output port 3 or 4, which serves as an optical switch. FIG. 9B shows a Mach-Zehnder type optical modulator according to a preferred embodiment of the present invention. The optical signal input from the input port 1 passes through a waveguide 110 made of linear polymer having a low light traveling loss within the optically active device. The optical signal is changed in its optical characteristics by the voltage directly applied to the electrode 130 or electric field while passing through the waveguide 120 made of the non-linear polymer of the electrode portion. The changed optical signal passes through again the waveguide 110 made of the linear polymer and is output to an output port 2. The thus-output optical signal modulates the intensity of the initial optical signal.

Since the optically non-linear effect occurs only at the region where an electrode is disposed in forming an optically active device using organic optical polymer, a waveguide core is formed by non-linear organic polymer only at the electrode portion, and a waveguide core is formed in the remaining regions where the non-linear effect is not necessary, using linear organic polymer having a light traveling loss lower than the non-linear organic polymer. Therefore, the overall injecting loss of the optically active device can be reduced.

As described above, in the method for fabricating an optical waveguide device using non-linear polymer according to the present invention, to reduce the waveguiding loss of the device, a waveguide made of non-linear polymer is selectively formed only at the region where the non-linear effect occurs, thereby improving the overall performance of the device.

Also, waveguide is formed using non-linear polymer only at the region where the non-linear effect such as optical modulation or optical switching occurs, and waveguide is formed using linear polymer at the remaining regions, thereby minimizing the overall waveguiding loss of the device, compared to the case when all waveguide is formed using non-linear polymer.

What is claimed is:

1. A method for fabricating an optically active device for transmitting at least one input light beam as at least one output light beam, the method comprising the steps of:

forming a lower clad layer using linear polymer on a substrate capable of transmitting ultraviolet light;

forming a first metal layer through which the ultraviolet light does not transmit at a region on the lower clad layer, other than the regions where the optical waveguide is to be disposed;

forming a second metal layer made of a material different from that of the first metal layer and incapable of transmitting the ultraviolet light on the first metal layer disposed on and adjacent to both ends of the linear core region;

forming a non-linear polymer layer on the waveguide region, first metal layer and second metal layer;

curing the non-linear polymer at only a non-linear core region by exposing the ultraviolet light to the substrate from its bottom side and removing any uncured non-linear polymer formed on the first and second metal layers;

forming a third metal layer on the non-linear polymer remaining on the non-linear core region;

removing the second metal layer;

forming a linear polymer layer on the first metal layer and said non-linear polymer;

curing the linear polymer at only a linear core region by exposing the ultraviolet light to the substrate from its bottom side and removing any uncured linear polymer;

removing the first metal layer disposed on the lower clad layer and the third metal layer; and forming an upper clad layer on the lower clad layer and waveguide core region.

2. The method according to claim 1, wherein the step of forming the lower clad layer is performed by a spin-coating method.

3. The method according to claim 2, wherein the step of forming the lower clad layer made of the spin-coated linear polymer comprises the steps of:

curing the lower clad layer by being exposed to the ultraviolet light; and baking the lower clad layer to improve film quality.

4. The method according to claim 1, wherein the step of forming the first metal layer comprises the steps of:

coating photoresist on the lower clad layer;

aligning photomasks of a predetermined pattern on the substrate to selectively expose the photoresist to the ultraviolet light;

dipping the photoresist into a developer liquid for development and baking the same to form a photoresist pattern;

depositing the first metal layer on the substrate having the photoresist pattern by a vacuum deposition method; and lifting off the photoresist.

5. The method according to claim 1, wherein the first metal layer in the step of forming the first metal layer is not etched by an etchant capable of etching the second metal layer.

6. The method according to claim 1, wherein the step of forming the third metal layer comprises the steps of:

coating photoresist on the substrate having the cured non-linear polymer formed in the step of forming the non-linear polymer;

patterning the photoresist by irradiating the ultraviolet light onto the substrate from its bottom side so that the photoresist disposed on the cured non-linear polymer is removed;

depositing the third metal layer on the patterned substrate by a vacuum deposition method; and lifting off the photoresist disposed on the substrate.

7. The method according to claim 1, wherein the step of removing the second metal layer is performed by etching the second metal layer by using an etchant incapable of etching the first metal layer.

8. The method according to claim 1, wherein the thickness of the linear polymer cured in the step of curing the linear polymer is adjusted by the amount of irradiated ultraviolet light.

9. The method according to claim 1, wherein the lower and upper clad layers have refractive indices lower than the linear polymer and the non-linear polymer formed as the waveguide cores.

10. The method according to claim 1, wherein the non-linear optical polymer material has an ultraviolet light sensitivity and non-linear optic chromophores as its functional groups.

11. The method according to claim 1, wherein the linear optical polymer material is a linear optical organic material having optical transparency against the wavelength of the light in use and an optical waveguiding loss lower than the non-linear polymer.

12. An optically active device for transmitting at least one input light beam as at least one output light beam, comprising:

a substrate;

a lower clad layer disposed on a substrate;

optical waveguide disposed on the lower clad layer, constructed of a non-linear core region necessitating a non-linear effect, and a linear core region not necessitating the non-linear effect, for waveguiding an optical signal; and an upper clad layer disposed on the optical waveguide and lower clad layer, wherein the non-linear core region of the optical waveguide is disposed between the linear core regions and made of non-linear polymer, the linear core region of the optical waveguide has one end connected to the non-linear core region and the other end connected to the input or output port of the optical signal and made of linear polymer having an optical waveguiding loss lower than the non-linear polymer, and wherein the lower and upper clad layers have refractive indices lower than those of the linear polymer and non-linear polymer formed as the waveguide cores.

* * * * *